Figure 4:
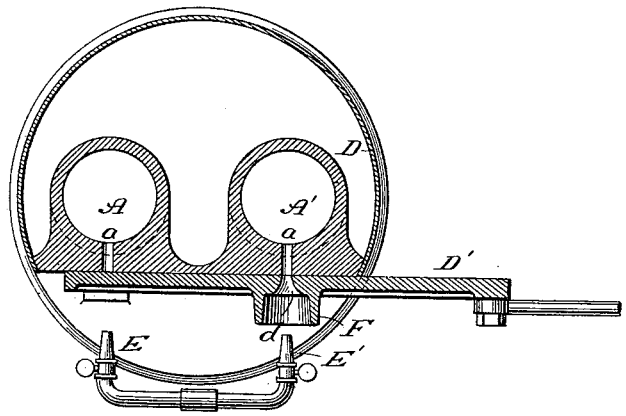

(No Model.) 8 Sheets—Sheet 1.
H. S. MAXIM.
GAS ENGINE.
No. 273,750. Patented Mar. 13, 1883.
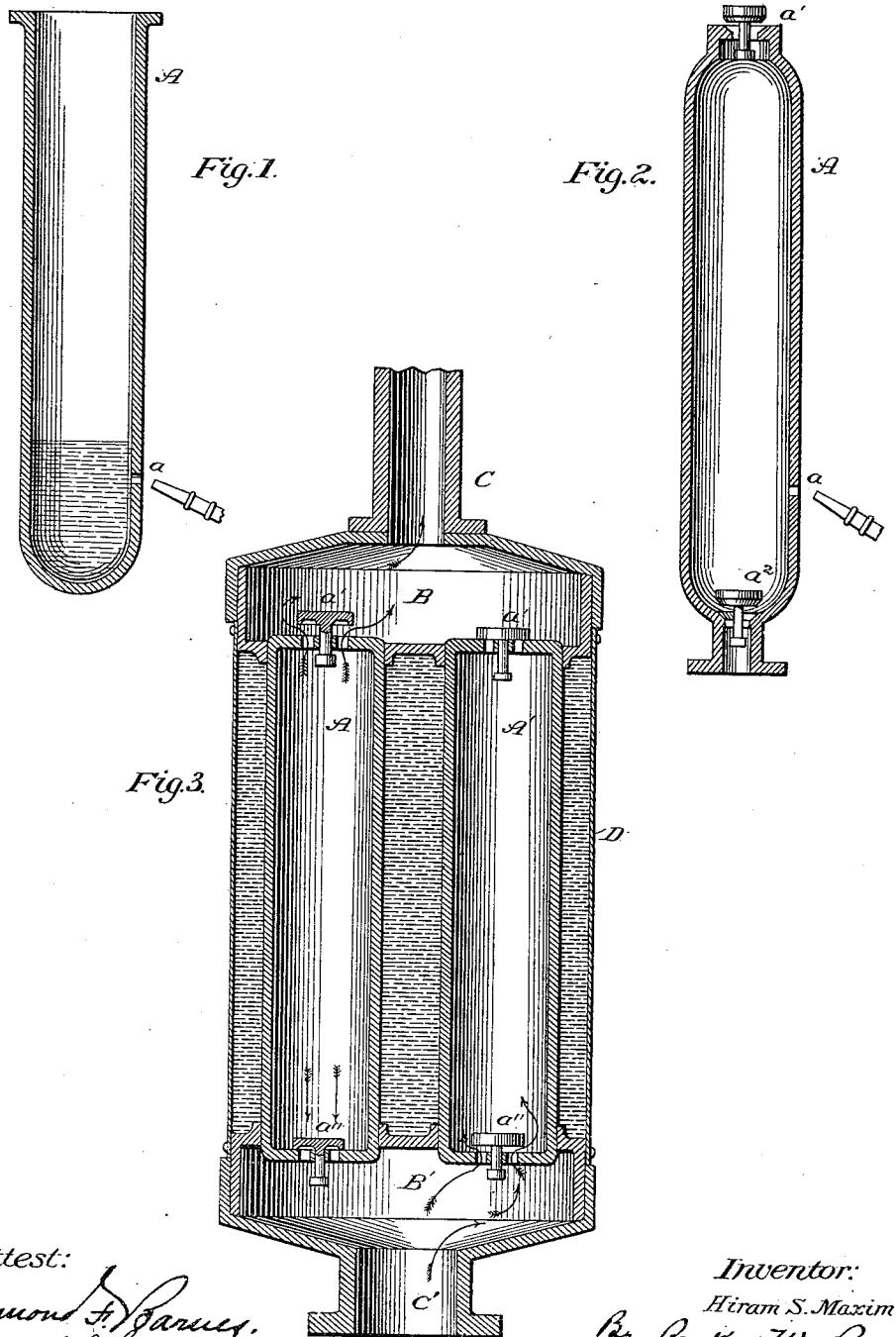
Attest:
Raymond F. Barney
Geo. W. Coy
Inventor:
Hiram S. Maxim.
By Parker W. Page
Atty.

(No Model.) 8 Sheets—Sheet 2.

H. S. MAXIM.
GAS ENGINE.

No. 273,750. Patented Mar. 13, 1883.

Attest:
Raymond F. Barnes.
Geo. W. Coy.

Inventor:
Hiram S. Maxim.
By Parker W. Page
Atty.

(No Model.)

8 Sheets—Sheet 3.

H. S. MAXIM.

GAS ENGINE.

No. 273,750. Patented Mar. 13, 1883.

Attest:
Geo W Leary
Raymond F. Barnes.

Inventor:
Hiram S. Maxim.
By Parker W. Page
Atty.

(No Model.)

8 Sheets—Sheet 6.

H. S. MAXIM.
GAS ENGINE.

No. 273,750.

Patented Mar. 13, 1883.

Attest:
Raymond F. Barnes.
Geo. W. Leay

Inventor:
Hiram S. Maxim
By Parker W. Page
atty.

(No Model.) 8 Sheets—Sheet 8.

H. S. MAXIM.
GAS ENGINE.

No. 273,750. Patented Mar. 13, 1883.

Attest:
Raymond H. Barnes.
Geo. W. Coy

Inventor:
Hiram S. Maxim.
By Parker W. Page
Atty.

UNITED STATES PATENT OFFICE.

HIRAM S. MAXIM, OF PARIS, FRANCE.

GAS-ENGINE.

SPECIFICATION forming part of Letters Patent No. 273,750, dated March 13, 1883.

Application filed August 23, 1882. (No model.)

*To all whom it may concern:*

Be it known that I, HIRAM S. MAXIM, a citizen of the United States, at present residing at Paris, France, have invented certain new and useful Improvements in Gas-Engines, of which the following is a specification, reference being had to the drawings accompanying and forming a part of the same.

In describing my invention I will first set forth the principle upon which the same is based by reference mainly to Sheet 1 of the accompanying drawings.

In Figure 1 is shown a vertical tube, A, made in the shape of an ordinary test-tube, though considerably longer. Near the lower or closed end of this tube is a small hole, $a$. Suppose, now, that the lower portion of tube A be filled with an explosive gas—a mixture of one part coal-gas to ten parts atmospheric air, for instance—and that a jet of flame be applied to the hole $a$, an explosion of the gas at once follows, the air within the tube being instantly expelled thereby. As the duration of the explosion or combustion of the gas is, however, very short, the air will again rush in to fill up the vacuous space.

Let a device be constructed as shown in Fig. 2, in which A designates a tube similar to that previously described, but closed at top and bottom, at which points it is provided with valves $a'$ $a''$, opening upward. If the lower portion of this tube be filled with an explosive gas and a jet of flame immediately applied to the touch-hole, an explosion follows, which expels the contained air through valve $a'$, at the same moment closing valve $a''$. As soon, however, as the gas is cooled down or consumed, the valve $a''$ opens by reason of the external pressure thereon—as, for example, atmospheric pressure or the expansion of air or gas contained within any chamber which might be placed in communication with said valve—and air rushes in to supply the place of that expelled. If, along with the air introduced in this manner, another charge of explosive gas be admitted and fired, the same action takes place, and by repeating the operation a succession of explosions is caused, each of which produces a vacuum within the tube, the device constituting practically an air-pump worked by the explosion of gas.

In order to make the operation of this pump continuous, an apparatus constructed substantially as shown in Fig. 3 may be used. In said figure, A and A' are two tubes, similar in general plan of construction to that shown in Fig. 2. Tubes A and A' are provided at top and bottom with valves opening upward. These valves establish communication with chambers B B', from the former of which leads a tube or pipe, C, and from the latter a pipe, C'. If charges of explosive gas be introduced into the tubes A A' and alternately exploded, it is obvious that the action of each, without interfering with the other, will contribute to maintaining a strong draft of air through pipe C'. Should this pipe be closed after the two chambers are filled with gas and air, there would be formed a partial vacuum therein, one which has been found to sustain about twenty-five inches of mercury, while the products of combustion and heated air will be driven off through pipe C.

In order to prevent heating of the tubes or chambers A A' when the explosions follow one another in rapid succession, it is desirable to surround them by a water-jacket, D. (Partly shown in Fig. 3.) The tubes A A' are in this figure to be provided with holes for igniting the gas, as in the previous instances, and the flame is to be applied to the same alternately as fast as the tubes receive their charge of gas. This principle of exhaustion I have utilized in the construction of engines generally, and I will now describe, by reference to the remaining figures of the drawings, the general mode of applying the same to the working of engines, and also certain mechanisms of a specific character, which I have designed for this purpose, and which contribute to the attainment of many new and useful results.

Fig. 3, above described, may be taken as a general illustration of the principle of construction of the exploding-chambers.

Figure 5:
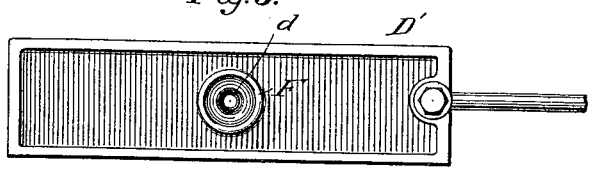

To utilize this apparatus for the development of power, it is to be applied to an engine made on the general plan of a common vacuum-engine, the pipe C' being for this purpose connected with the pipe corresponding in an engine to the exhaust. The power, under these conditions, is developed by the engine delivering air into the pipe C'. When used, however, to operate an engine it will be necessary to apply the flame for the explosion of the gas automatically, and for this purpose I have devised a self-acting valve-gear. This is illustrated in Figs. 4 and 5, in which Fig. 4 is a horizontal section of the apparatus shown in the previous figure, taken through the lower portions of the exploding-chamber, and Fig. 5 a plan view of the plate constituting the slide-valve.

Figure 6:
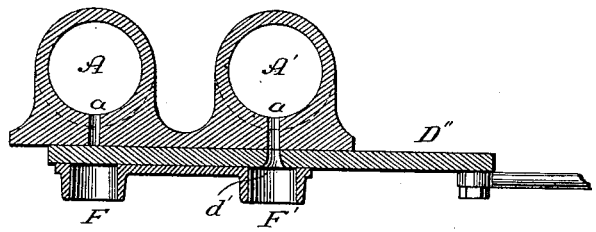
Figure 7:
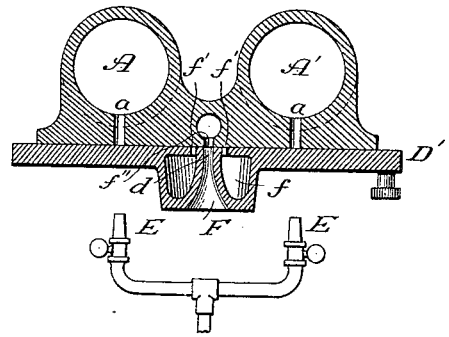

A A' designate the exploding-chambers; D, the shell or casing surrounding the same and forming a water-jacket. This jacket surrounds the sides of the chambers A A', except at those points where the holes $a\ a$ are formed. These portions of the chambers are shaped in a manner to form flat surfaces, or are joined by a solid casting, as shown, and upon such portion is fitted a plate, D', provided with an opening, $d$, surrounded by an open chamber, F, and constructed to operate as a slide-valve, its movement causing the hole $d$ to register alternately with the holes $a\ a$. Below the holes $a\ a$ are arranged gas-burners E E', of suitable and well-known construction for this purpose, that direct a jet of flame through the holes $d$ and $a$ when they register. If the plate D' be properly connected to some moving part of the engine, it is drawn to and fro, thus closing the hole $a$ in one cylinder and opening that in the other, the action being such that the valve is moved to close that hole through which the flame has been forced before air has commenced to fill the vacuous space caused by the explosion. Several modifications of this arrangement are possible. For instance, in Fig. 6 is shown in section the exploding-chambers, constructed as before. In this case, however, the flame-chambers F F', or the recesses into which the jet of flame is forced, are two in number, directly under the holes $a\ a$ and stationary. A sliding plate, D'', with a single hole, $d'$, is fitted over the holes $a\ a$ and reciprocated by some moving part of the engine in such manner that communication between the exploding and flame chambers will be alternately established. In Fig. 7, which is a similar view in horizontal section of the exploding-chambers, another modified form of valve is illustrated. In this instance two burners, E E, and a single flame-chamber, F, in a sliding plate, D', are employed. The chamber F is surrounded by an annular chamber, $f$, in which are two openings, $f'\ f'$, on either side of the hole $d$, that register with a passage-way, $f''$, through which explosive gas is admitted. The purpose of such arrangement is as follows: Through the holes $f'\ f'$ the annular chamber $f$ is filled with gas. By the movement of the plate D' the holes $f'$ are brought over the touch-holes $a$ and the gas sucked up into the exploding-chambers. Immediately afterward the hole $d$ reaches the touch-hole and the gas in the exploding-chamber is ignited. By this means a saving in fuel is effected and the gas confined to that portion of the cylinders where the flame is applied. When this comparatively small quantity of gas is exploded it drives the air out of the other end of the cylinder, and the same results are secured as when the whole body of air within the cylinder is impregnated with gas.

Figure 8:
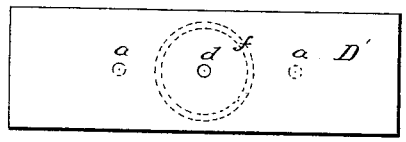

In Fig. 8 I have shown a plan view of the under side of plate D', the holes $a\ a$ and annular chamber $f$ being shown in dotted lines.

Figure 9:
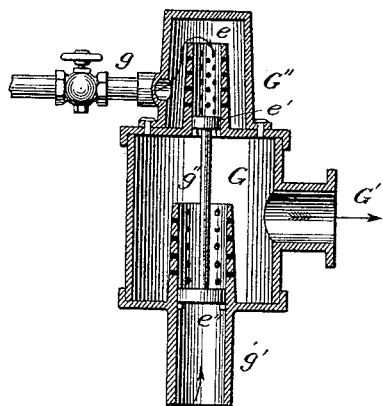

In order to determine the proper proportions of gas and air admitted to the exploding-chambers, I have devised an apparatus shown in central vertical section in Fig. 9. In said figure, G is a small cylindrical chamber, provided with a delivery-pipe, G'. Above the main cylinder is a smaller chamber, G'', into which leads a pipe, $g$. In the bottom of chamber G enters a pipe, $g'$, containing a valve-seat, and perforated along the portion that extends within the chamber. A similarly-perforated pipe, $e$, of smaller diameter, extends up into the chamber G'' and contains a valve-seat. Valves $e'\ e''$, connected by a stem, $g''$, work in the pipes $g'$ and $e$, respectively. Air is drawn into chamber G through pipe $g'$, and gas into chamber G'' through pipe $g$. When the engine with which pipe G' is connected requires air and gas the air is drawn up through pipe $g'$. This raises the valves until a greater or less number of perforations in the pipe $g'$ are opened. The upper valve is at the same time raised off its seat and gas admitted through the perforations of pipe $e$ and mixes with the air in chamber G. If but little air is drawn in, a small quantity only of gas will be mixed with it, and so for any quantity of air the same proportionate quantity of gas enters. When no air enters the gas is shut off, so that no unnecessary leakage or escape takes place. The relative proportions of the gas and air is easily determined by the relative sizes of the pipes $e$ and $g'$ or the number of perforations therein.

Figure 10:
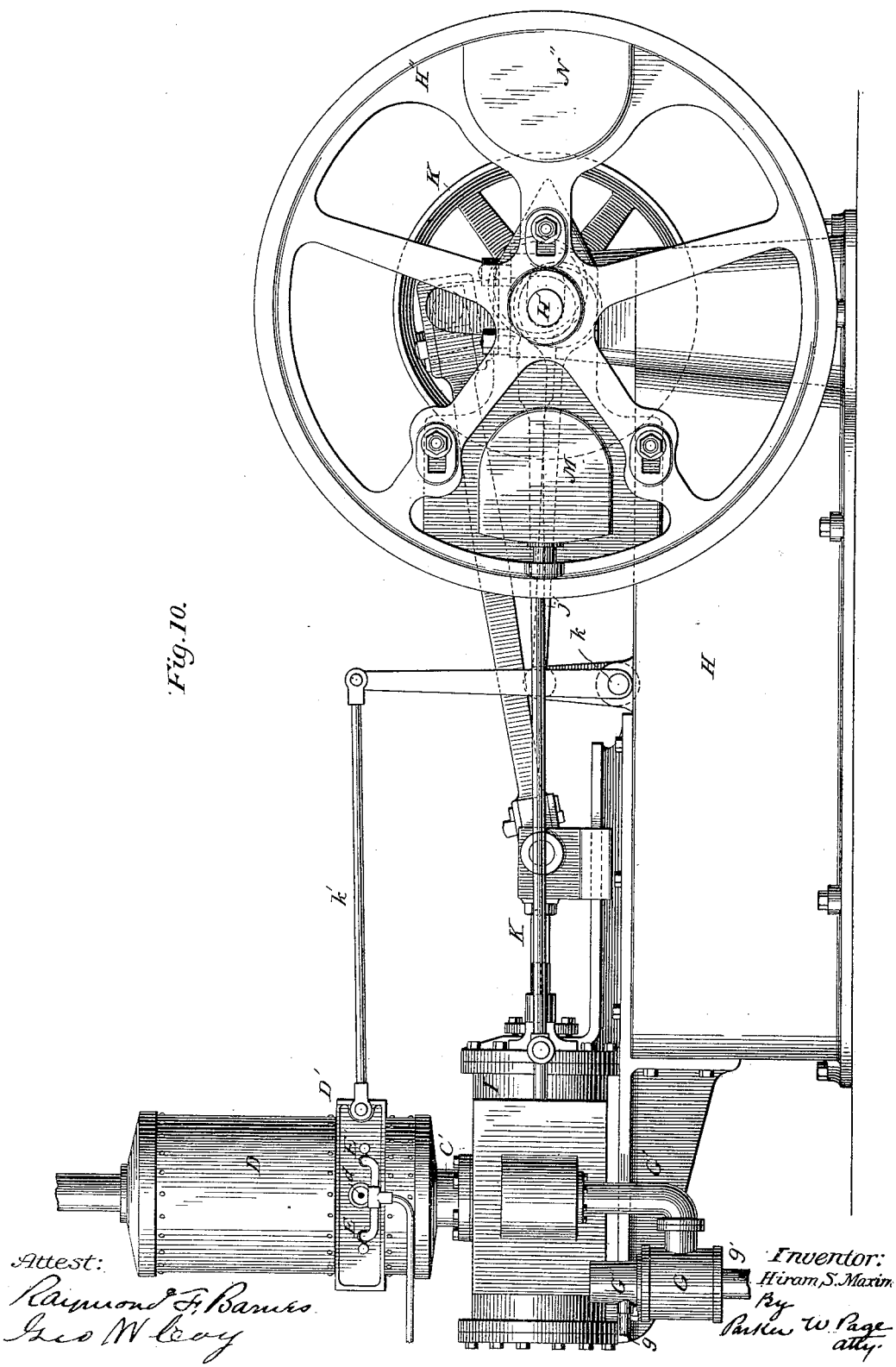
Figure 11:
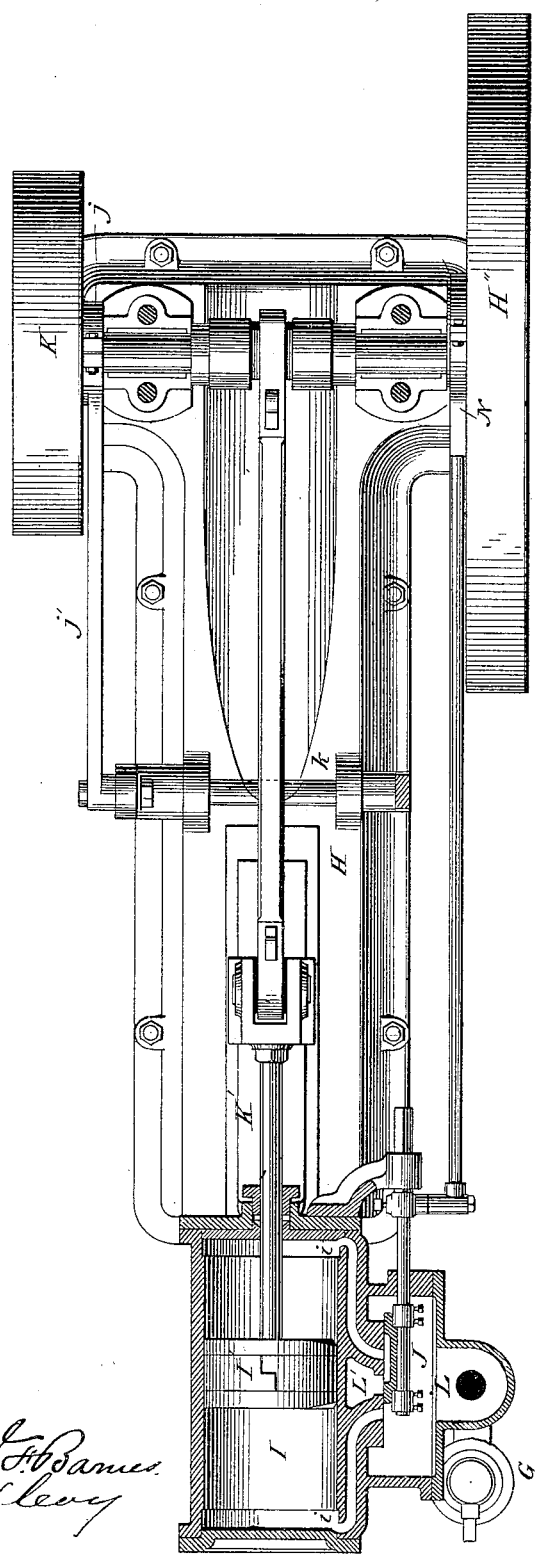

In Figs. 10 and 11 I have illustrated the practical application of this invention to an engine. Fig. 10 shows the engine in side elevation, and Fig. 11 is a plan view of the same with the cylinder and valve mechanism shown in section.

The several parts of the engine are supported by a substantial base, H, and consists, in the main, of a main shaft, H', a fly-wheel, H'', a pulley-wheel, K, a cylinder, I, piston I', piston-rod K', and valve mechanism. Connected with what corresponds to the steam-pipe of an ordinary engine is the pipe G' from the mixing-chamber G, a description of which has been given above. With the exhaust-pipe of the cylinder I is connected the pipe C' from two exploding-chambers constructed as above described, inclosed in a water-jacket, D, and provided with valve mechanism for alternately exploding the gas in the two chambers. The cylinder I differs in two essential particulars from those ordinarily used in engines of this character, except that in size it should be of relatively greater size for a given power, and may be made of much lighter materials than those ordinarily employed. From the opposite sides of its piston I' lead the ports $i\ i'$, which by means of the slide-valve J are alternately brought into communication with the passage L, connected with the pipe G', and the exhaust-chamber L', connected with the pipe C', leading to the exploding-chambers.

By means of proper devices, consisting of an eccentric, $j$, rod $j'$, rock-shaft $k$, and rod $k'$, or similar means, the slide-valve D', that controls the explosion of the gas in the exploding-chambers, is shifted in unison with the moving parts of the engine.

Figure 12:
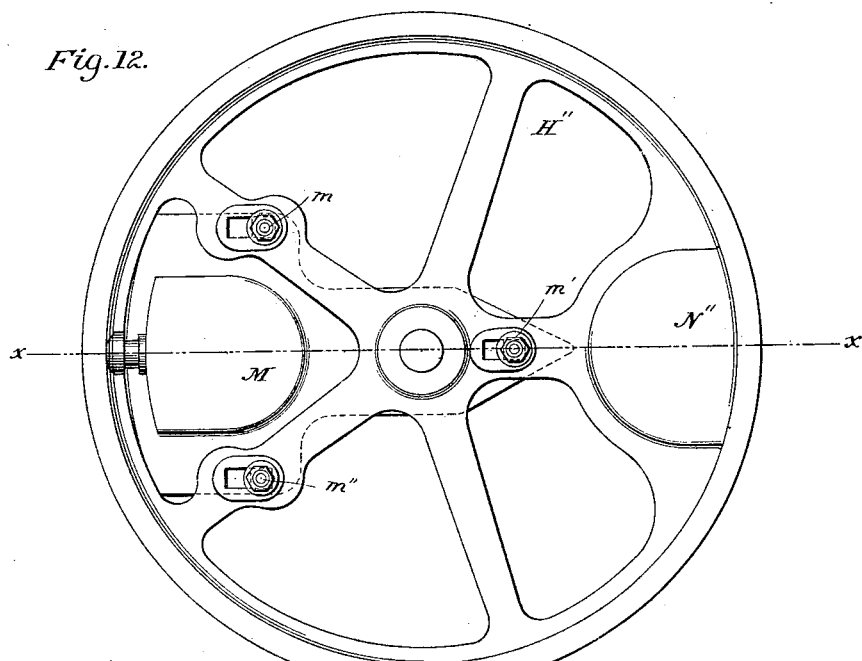
Figure 13:
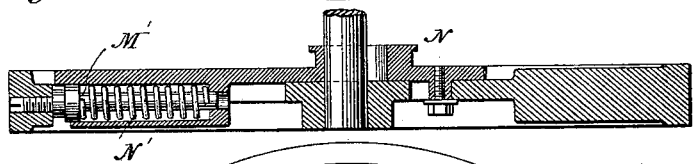
Figure 14:
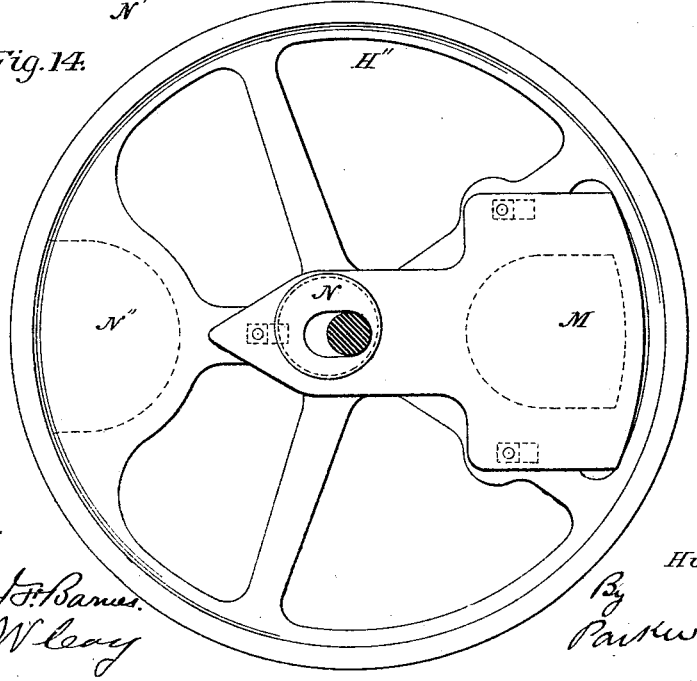

When a valve similar in construction or principle of operation to valve J is used, I employ a weighted or sliding eccentric to operate the same, the object of such an arrangement being to cut off the air admitted to the opposite sides of the cylinder, and thence to the exploding-cylinder, earlier or later in the stroke, according to the load upon the engine. For instance, if the load is light, the eccentric causes the valve to cut off the air early in the stroke, whereas if the load is heavy the eccentric moves into a position where the slide-valve admits air up to three-fourths of the stroke. The eccentric is shown in position in Figs. 10 and 11, and is illustrated in detail in Figs. 12, 13, and 14, in which Fig. 12 is a view in elevation of the fly-wheel H'' with the eccentric connected therewith; Fig. 13, a sectional view on line $x\ x$ of Fig. 12; and Fig. 14 is a view in elevation of the inner side of the fly-wheel and eccentric. On the fly-wheel is a casting that forms the eccentric N and the governor-weight M. It is secured to the fly-wheel at three points by screws $m\ m'\ m''$, that pass through slots. Secured to the rim of the fly-wheel is a rod, M', surrounded by a spiral spring, N', the rod and spring constituting a spring-piston and acting to force the eccentric N and weight M into the position shown in the figures. As the fly-wheel revolves the weight M is thrown out by centrifugal force against the force of spring N', the eccentric being shifted in position thereby, the effect of such displacement, as is well known, being to close the valve or cut off the air earlier in the stroke. The eccentric and governor should be mounted to operate freely on the fly-wheel, and a counter-weight, N'', should be used.

The operation of the engine, the several parts of which have now been described, is readily understood. By the mixer G the proper proportions of air and gas are combined and introduced into the exploding-chambers in jacket D through the valve J, the ports $i\ i'$, the cylinder I, and the passage L', connecting with the pipe C'. By the valve D', operated by the rock-shaft $k$, the gas is exploded alternately in the two chambers, and by the pressure of the air on the opposite sides of the piston I' the shaft H' is driven. The pressure on the piston, as above described, is controlled by the action of the valve J and the eccentric N. The operation of an engine thus constructed is exceedingly steady and uniform.

Having now described the most efficient and practical manner of which I am aware of constructing and applying the devices which form the subject of my present invention, it remains to point out in what ways the general plan of construction may be varied and under what conditions the same may be applied.

Figure 15:
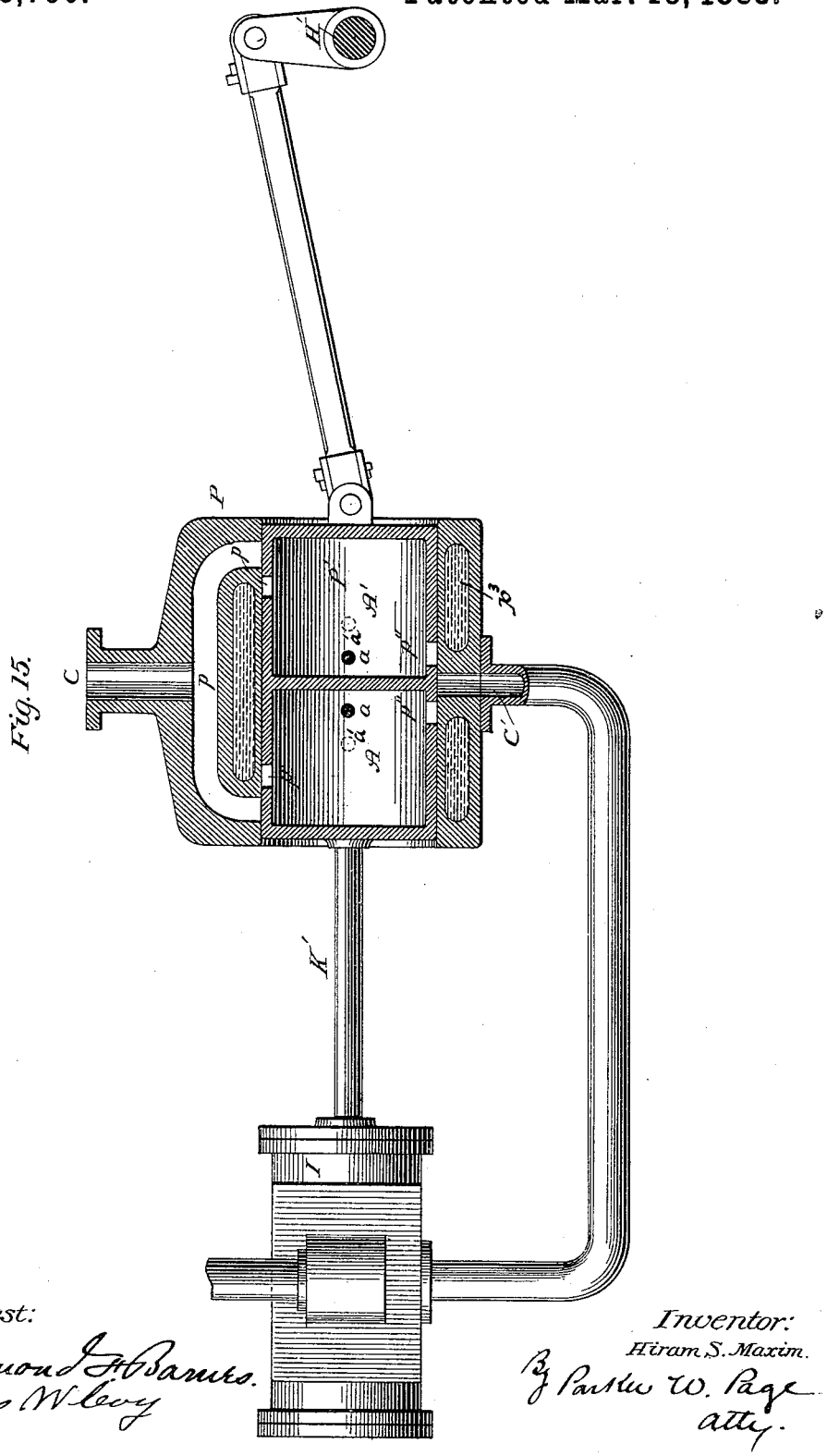

In Fig. 15 is shown a construction by means of which the slide-valve is dispensed with. P is a ring or cylindrical casing, provided with an annular water-space, $p^3$, and having ports $c$ and $c'$ and a passage, $p$. In the cylinder or ring P works a cylinder, P', containing two compartments, A and A', and provided with ports $p'\ p''$. Cylinder P' is connected to the piston-rod K' at one end and to the main shaft H' at the other by a connecting-rod. In the sides of the cylinder P', and in position to register with openings $a$ (shown in dotted lines) in the ring P, are the touch-holes $a\ a$, through which the exploding-flame is to be drawn. The ports $p'\ p''$ are so situated that when $p'$ of compartment A is opposite the passage $p$ the port $p''$ of compartment A' registers with the pipe or opening $e'$. The design is to explode the gas in compartment A at this precise moment and drive the air out through passage $p$. If the cylinder P be forced back before the expelled air has a chance to re-enter, the port $p''$ of compartment A will reach the pipe C' just as the port $p'$ of the other compartment reaches the passage $p$ and the explosion in that compartment is taking place. The vacuum in compartment A causes the piston-rod K' to move by the pressure which is exerted through the pipe C' on the piston in the working-cylinder I. The cylinder P will, in consequence, be drawn back and the gas in compartment A which is drawn in the pipe C' and cylinder I exploded. The action of this device, as will appear from the foregoing, is automatic after being once started.

Figure 16:
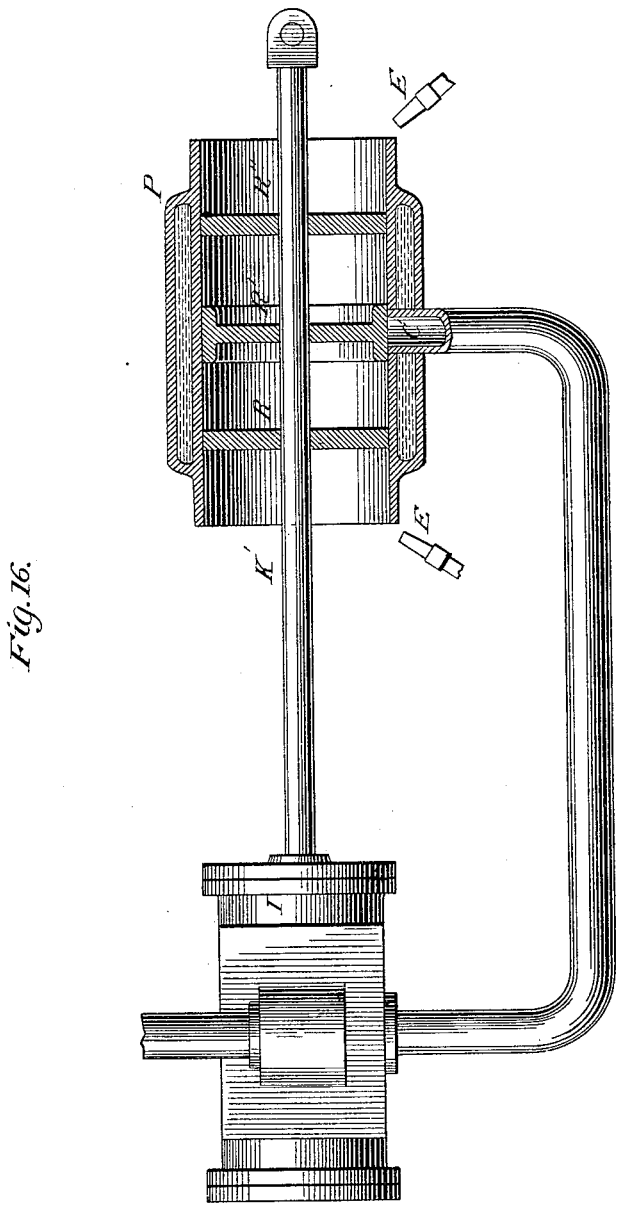

In Fig. 16 is a further modification of the same principle, the figure showing in section an arrangement of three pistons, R R' R'', on the piston-rod K' and working in a smooth cylinder, P, surrounded by a water-jacket. A pipe, C', leads from the center of cylinder P to the exhaust of a cylinder, I, and two jet-burners, E E, are arranged at the ends of cylinder, P, in such manner that when the pistons R' R'' have by the movement of the piston-rod K' been carried beyond the edge of the cylinder P the flame from the right-hand burner E is drawn into the compartment formed by pistons R and R'. The gas in the compartment is thus exploded, and the piston-rod being moved back immediately after the explosion, the air which is driven out does not have a chance to re-enter, the chamber being closed by the movement of rod $k$ as soon as the air has been expelled from said chamber. When the compartment, however, passes over the entrance of pipe C' the air and gas from one side of the piston in cylinder I is sucked out and the piston driven forward. This operation continues as long as gas is supplied through the engine.

In both of the forms illustrated in Figs. 15 and 16 it is necessary to employ some means of starting the engine, so that under the conditions here prescribed these forms will be found better suited to light-working engines or toys and the like.

It may be stated that oscillating, rotary, or other forms of engines than those described may be equally well used in conjunction with the exhaust or exploding devices. It is obvious, too, that instead of engines other such devices—such as suction-pumps—may be operated by the explosion of gas under the conditions hereinbefore set forth. The explosion-chambers may be also employed generally under the same conditions as ordinary air or vacuum pumps. It will be advantageous to employ, however, engines specially designed for this purpose and made much lighter than is ordinarily the case. In fact, when great lightness is required, the engine may be built of tin, sheet-steel, brass, or other such metals.

When it is impracticable or inconvenient to use water the exploding-chambers should be made quite long, so that but little heat will reach the discharge-valve. When water in sufficient quantity can be easily obtained, however, it is advantageous to employ the water-jacket arranged in the manner described or in any other convenient way.

Results the same as those set forth may obviously be attained by the explosion of volatile liquids in lieu of gas; but inasmuch as certain mechanism of specifically different character is required for measuring the amount of and exploding the charges, this part of the invention will be made the subject-matter of another application.

Having now described my invention, what I claim as new, and desire to secure by Letters Patent, is—

1. The combination, with a tube, cylinder, or other chamber to be exhausted, of exploding-cylinders or similar chambers provided with induction or eduction valves and exploding-apertures, the communication between the tube or cylinder and the exploding-chambers being established through the induction-valves, as and for the purpose set forth.

2. The combination, with the exhaust-pipe of an engine, of two exploding-chambers containing induction and eduction valves, means for introducing air and gas into said exploding-chambers, and means for exploding the same in the cylinders alternately.

3. The combination, with the exhaust-pipe of a cylinder of an engine, of exploding-cylinders provided with induction and eduction valves, means for exploding charges of gas in the cylinders alternately, a device for mixing gas and air in definite proportions, and means for admitting the same to the cylinder on opposite sides of the piston, as set forth.

4. The combination, with the exhaust-pipe of an engine, of exploding-cylinders having induction and eduction valves, a water-jacket surrounding said cylinders, means for introducing gas and air into the cylinders, and means for exploding the same in the cylinders alternately, as set forth.

5. The combination, with the exhaust-pipe of an engine, of a vacuum apparatus operating by the explosion of gases, and a mixer for combining definite proportions of gas and air connected with the engine and adapted to deliver air and gas through the engine into the exploding-cylinders, as set forth.

6. A motive-power engine consisting of the following instrumentalities in combination, to wit: a cylinder and piston and means for utilizing or applying the movement of the same, a mixer for combining definite proportions of air and gas and admitting the same to the cylinder, valve mechanism for controlling the admission of gas and air, a governor connected with said valve, exploding-chambers containing induction and eduction valves, and means for igniting the gas in said chambers alternately, as set forth.

7. A mixing device for gas-engines, consisting of the following elements in combination, to wit: a box or chamber, a perforated air-tube extending into the same, an adjoining chamber communicating with a gas-supply, a perforated tube extending into the same from the first chamber, pistons working in the perforated tubes, and a rod connecting them, all substantially as set forth.

In testimony whereof I have hereunto set my hand this 7th day of August, 1882.

HIRAM STEVENS MAXIM.

Witnesses:
ROBT. M. HOOPER,
DAVID T. S. FULLER.